Patented Sept. 4, 1923.

1,467,258

UNITED STATES PATENT OFFICE.

ARTHUR ULLRICH, OF FRANKFORT-ON-THE-MAIN, GERMANY.

PROCESS OF MANUFACTURE OF DIPHENYLENE DIKETONES AS ANTHRAQUINONE OR ITS DERIVATIVES.

No Drawing. Application filed August 9, 1921. Serial No. 491,024.

*To all whom it may concern:*

Be it known that I, ARTHUR ULLRICH, a citizen of Germany, residing at Frankfort-on-the-Main, Germany, have invented certain new and useful Improvements in Processes of Manufacture of Diphenylene Diketones as Anthraquinone or its Derivatives, of which the following is a specification.

The present process refers to the manufacture of diphenylene diketones as anthraquinone or its derivatives by oxidation of anthracene compounds. It refers for instance to the manufacture of anthraquinone from anthracene, oxanthranol, monochloranthracene, dischloranthracene etc. or of sulphonic acids of anthraquinone from anthracene, dichloranthracene etc. or of oxygen.

It is known that one may manufacture diphenylene diketones as anthraquinone or its derivatives from anthracene or its derivatives by means of nitric acid or oxides of nitrogen. The use of nitric acid and oxides of nitrogen has the defect that impurities are formed which even after repeated sublimation or recrystallization of the anthraquinone are separated only with difficulty and greatly affect the working up of the product.

In order to prevent the defects of the presence of nitric acid, used as oxidizing agent or formed during the reaction I have described a process consisting in the use of organic acids free of water and the use of water binding agents. The present process allows the use of organic acids containing water and the use of fuming nitric acid or generally nitric oxides, which may contain water or nitric acid as catalysts in the oxidation by means of oxygen under pressure. The new process consists in oxidizing the anthracene compounds which are intended to be transformed into diphenylene diketones by means of oxygen under pressure in presence of metal salts of the organic acids. The new process is carried out by using metal nitrites reacting with the organic acids with formation of metal salts of the organic acids which react with the formed nitric acid with formation of metal nitrates or in adding metal salts of the organic acids reacting with the used or formed nitric acid with formation of metal nitrates. One may use the said metal nitrites and add metal salts of the organic acids reacting with nitric acid with formation of metal nitrates. One may use metal salts of other organic acids than those which are used as solvent or diluent. Suitable salts are for instance alkali acetate, as sodium acetate, propionate, suitable organic acids are for instance acetic acid, propionic acid. The nitrite, if soluble, may be used in the form of an aqueous solution. The metal salts of organic acids may be used in water free state, for instance dry, or calcined or in aqueous solution. Preferably I use such amounts of the metal salts of organic acids that the nitric acid is completely transformed into metal nitrates.

The following examples illustrate the invention:

1. 100 kilogrammes anthracene of 91 per cent strength are heated at about 90 degrees centigrade while stirring in a closed vessel with 500 kilogrammes concentrated acetic acid and about 1–5 kilogrammes sodium nitrite are added and oxygen is introduced under pressure. The introduction of oxygen is stopped, when the oxygen is not absorbed. One allows then the mass to cool and separates the undissolved anthraquinone from the liquid in any suitable manner, for instance by filtering, preferably under suction. The yield in anthraquinone amounts to about 95 per cent; the melting point is 281 degrees centigrade; the product contains about 98 per cent of anthraquinone.

2. 100 kilogrammes of anthracene of 85 per cent strength are heated at about 90 degrees centigrade while stirring in a closed vessel with about 500 kilogrammes concentrated acetic acid, added slowly with about 5–10 liters fuming nitric acid and oxygen is introduced under pressure. One adds gradually about 10–20 kilogrammes sodium acetate. The working is then carried out as indicated in Example 1. The yield in anthraquinone amounts to about 95 per cent; the melting point is about 279–280 degrees centigrade, the product contains about 97 per cent of anthraquinone.

I claim:—

1. The process for manufacturing diphenylene-diketones, which comprises treating an anthracene compound with oxygen under superatmospheric pressure in the presence of an organic acid, an oxygen carrier comprising a nitrogen-oxygen compound, and a metal salt of an organic acid capable of reacting with nitric acid with the formation of a metal nitrate.

2. The process of manufacturing diphenylene-diketones, which comprises adding a metal nitrite to a mixture containing an anthracene compound and an organic acid and passing oxygen through the mixture under superatmospheric pressure.

3. The process of manufacturing diphenylene-diketones, which comprises treating an anthracene compound with oxygen under superatmospheric pressure in the presence of a nitrogen-oxygen compound, an organic acid, water, and a metal salt of an organic acid capable of reacting with nitric acid with the formation of a metal nitrate.

4. The process of manufacturing diphenylene-diketones, which comprises adding a metal nitrite in aqueous solution to a mixture of an anthracene compound and an organic acid and passing oxygen through the mixture under superatmospheric pressure.

In testimony whereof I hereunto affix my signature.

ARTHUR ULLRICH.

Certificate of Correction.

It is hereby certified that in Letters Patent No. 1,467,258, granted September 4, 1923, upon the application of Arthur Ullrich, of Frankfort-on-the-Main, Germany, for an improvement in "Processes of Manufacture of Diphenylene Diketones as Anthraquinone or Its Derivatives," errors appear in the printed specification requiring correction as follows: Page 1, line 16, for the misspelled word "dischloranthracene" read *dichloranthracene*, and line 18, for the words "dichloranthracene etc. or" read *sulphonic acids by means;* and that the said Letters Patent should be read with these corrections therein that the same may conform to the record of the case in the Patent Office.

Signed and sealed this 23d day of October, A. D., 1923.

[SEAL.]

WM. A. KINNAN,
*Acting Commissioner of Patents.*